United States Patent [19]

Webbon et al.

[11] 4,091,465
[45] May 30, 1978

[54] SPACESUIT TORSO CLOSURE

[75] Inventors: Bruce W. Webbon, San Jose; Hubert C. Vykukal, Los Altos, both of Calif.

[73] Assignee: The United States of America as represented by the Administrator of the National Aeronautics and Space Administration, Washington, D.C.

[21] Appl. No.: 780,569

[22] Filed: Mar. 23, 1977

[51] Int. Cl.² .......................................... B63C 11/04
[52] U.S. Cl. ............................................... 2/2.1 A
[58] Field of Search ............................ 2/2.1 R, 2.1 A

[56] References Cited

U.S. PATENT DOCUMENTS

| | | | |
|---|---|---|---|
| 2,410,632 | 11/1946 | Colley et al. | 2/2.1 A |
| 2,433,768 | 12/1947 | Krupp | 2/2.1 A |
| 3,636,564 | 1/1972 | Vykukal | 2/2.1 A |

Primary Examiner—Alfred R. Guest
Attorney, Agent, or Firm—Darrell G. Brekke; John R. Manning; Armand McMillan

[57] ABSTRACT

A separable entry closure assembly for joining axially separable tubular segments of a pressure suit along an angulated zone of separation having a first portion projected transversely beneath the axilla zone of the suit and a second portion projected behind the shoulder zone thereof and characterized by a first endless member of a rigid configuration affixed to one segment of the suit, a second endless member of a rigid configuration affixed to the other segment and mated in hermetically sealed relation with the first endless member, and a releasable "C" section clamp releasably securing the first endless member to the second endless member.

8 Claims, 15 Drawing Figures

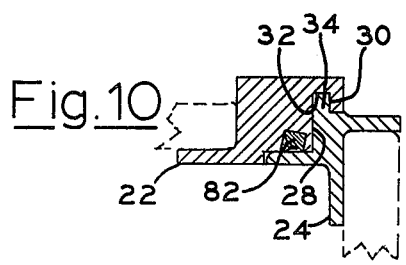
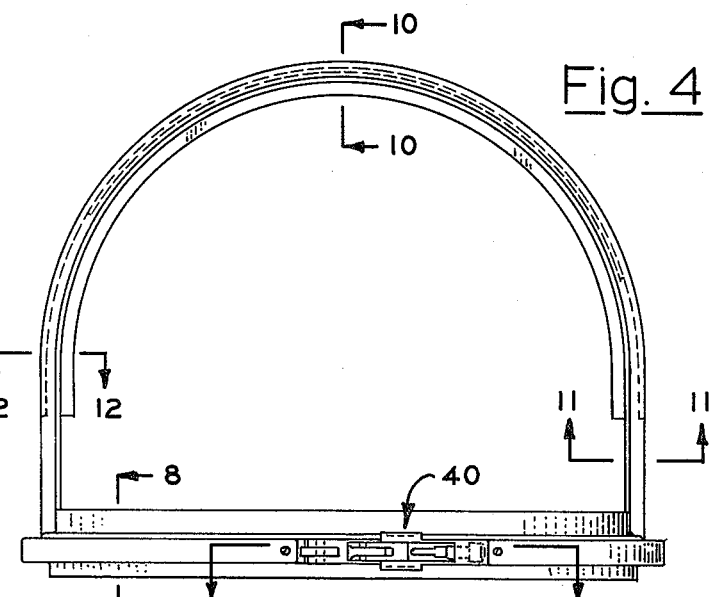
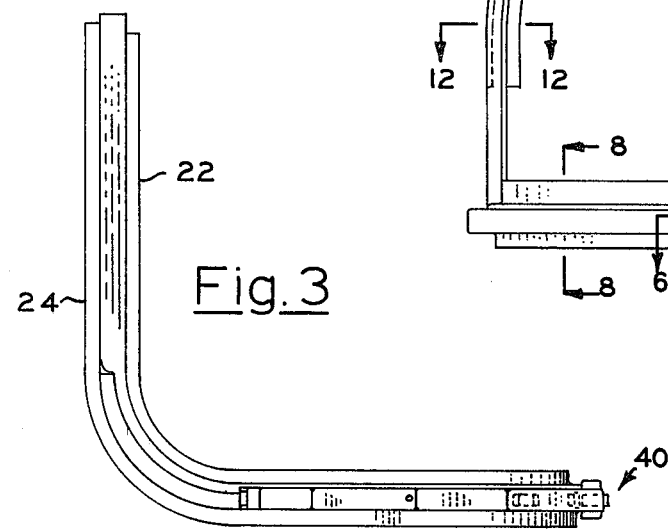
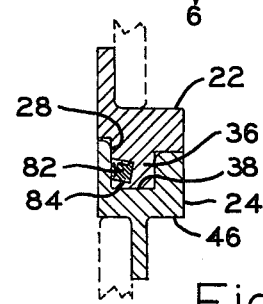
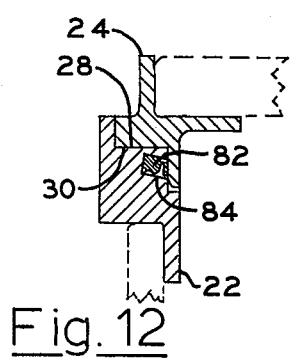
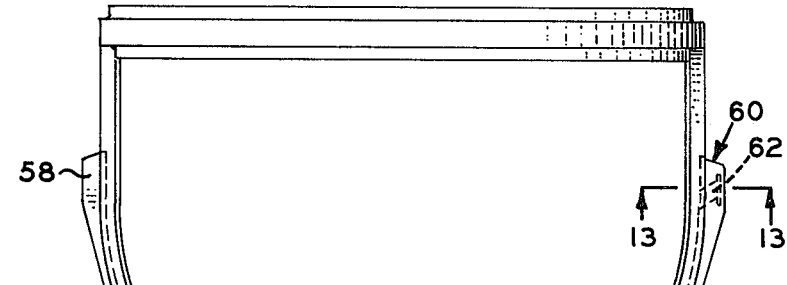
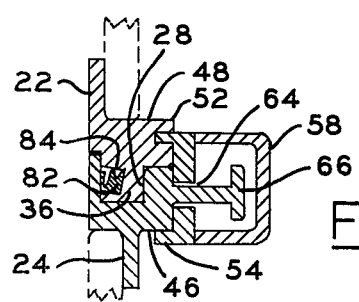
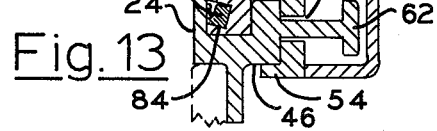

SPACESUIT TORSO CLOSURE

The invention described herein was made by employees of the United States Government and may be manufactured and used by or for the government for governmental purposes without the payment of any royalties thereon or therefor.

BACKGROUND OF THE INVENTION

1. Field of the Invention

The invention relates generally to entry closure assemblies for pressure suits, and more particularly to an improved entry closure member for joining substantially rigid segments of a torso for a spacesuit in a manner which simplifies a self-donning of the suit.

2. Description of the Prior Art

Pressure suits, such as spacesuits and the like, are, of course, generally bulky and of a complex design. Consequently, they often are difficult to assemble in an encasing relation with a wearer, herein referred to as "donning", due to the effects of the structure of life support and similar systems. Various devices, mechanisms and systems have been devised in numerous attempts to overcome the recognized problems which attend the donning of pressure suits. For example, hard spacesuits heretofore have been severed along angulated planes passing through the torso regions thereof and entry closure assemblies provided for joining the opposed segments. Similarly, soft spacesuits have been provided with entry openings, of various configurations, strategically located, and closed by suitable entry closure assemblies. Such may be found in the so-called Apollo suit.

Among the mechanisms previously devised for use as entry closure assemblies for joining opposed sections of pressure suits and the like are zippers, laces and mechanical coupling mechanisms. The most commonly employed mechanisms heretofore employed have been zippers including integral seals, particularly for soft spacesuits. These mechanisms generally are characterized by relatively high leakage and their use frequently is attended by loss of reliability, particularly where the zippers are employed over periods of extensive durations. Moreover, zippers simply do not readily lend themselves to use in joining rigid segments of hard suits. For purposes of joining opposite halves of pressure suits formed of rigid materials, mechanical systems comprising simple "C" section clamps have been employed with a modicum of success, but generally lack desired reliability for missions of long durations. Further, entry closures equipped with cam-driven locking pins and the like have been suggested. However, as can be appreciated by those familiar with the art, such systems tend to be of complex design, are frequently bulky and generally economically unfeasible. Hence, the use thereof has not been generally accepted.

It is therefore the general purpose of the instant invention to provide a simple, economical and reliable entry closure for joining opposite halves of a torso section for a pressure suit in a manner which simplifies self-donning.

OBJECTS AND SUMMARY OF THE INVENTION

It is therefore an object of the instant invention to provide an improved entry closure for pressure suits.

It is another object to provide in a pressure suit a separable entry closure for releasably joining coaxially aligned tubular segments of the suit.

It is another object of the instant invention to provide a simplified and reliable closure member for joining opposite halves of a hard pressure suit in a manner which simplifies self-donning.

It is another object to provide a practical, separable entry closure member for joining a pair of coaxially aligned, axially separable, tubular segments of a hard pressure suit along an angulated zone of separation configured to facilitate self-donning.

It is another object to provide a highly reliable, sealable entry closure for a rigid torso structure which is of a lightweight construction and economic to manufacture and assemble.

It is another object to provide in a pressure suit a simple, economical and practical to manufacture and employ entry closure member for joining coaxially aligned, axially separable, tubular segments of a hard spacesuit along an angulated zone of separation having a segment which lies in a plane projected transversely with respect to the suit, beneath the axilla zone thereof, and a second portion disposed in a plane projected behind the shoulder zone of the suit in substantial parallelism with the longitudinal plane of symmetry for the suit.

These and other objects and advantages are achieved through the use of a pair of endless members of rigid configurations, each having a segment disposed in a first plane projected transversely beneath the axilla zone of a pressure suit, and a second arcuate segment disposed in a second plane projected longitudinally to the rear of the shoulder zone of the suit, characterized by transversely angulated surfaces adapted to be mated in an hermetically sealing relation, and a "C" section clamp for securing the members in their mated relationship, as will become more readily apparent in view of the following description and claims in light of the accompanying drawings.

IN THE DRAWINGS

FIG. 3 is a side elevational view of the closure assembly depicting a mated relationship for the closure members of the closure assembly.

FIG. 4 is a front elevational view of the assembly shown in FIG. 3.

FIG. 5 is a top-plan view of the assembly shown in FIGS. 3 and 4.

FIG. 10 is a cross-sectional view taken generally along lines 10—10 of FIG. 4.

FIG. 11 is a cross-sectional view taken generally along lines 11—11 of FIG. 4.

FIG. 12 is a cross-sectional view taken generally along lines 12—12 of FIG. 4.

FIG. 13 is a cross-sectional view taken generally along lines 13—13 of FIG. 5.

FIG. 14 is a cross-sectional view taken generally along lines 14—14 of FIG. 5.

DETAILED DESCRIPTION OF THE PREFERRED EMBODIMENT

Figure 1:
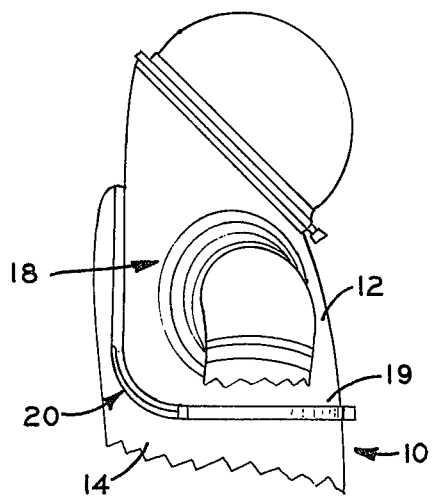
FIG. 1 is a fragmented, side elevational view of a pressure suit equipped with a closure assembly which embodies the principles of the instant invention and which includes a pair of endless closure members secured together by a releasable coupling mechanism.
Figure 2:
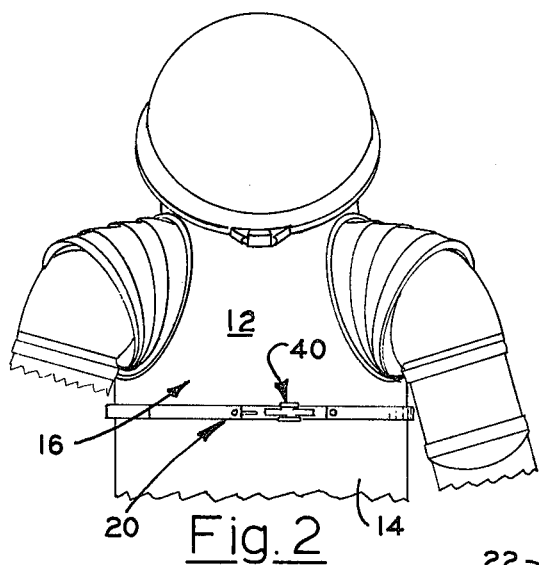
FIG. 2 is a fragmented, elevational front view of the pressure suit shown in FIG. 1, depicting a preferred location for the releasable coupling mechanism provided for securing the closure members of the closure assembly in an hermetically sealed relationship.

Referring now with more particularity to the drawings, wherein like reference characters designate like or corresponding parts throughout the several views, therein is depicted a pressure suit, generally designated 10, of substantially rigid construction. While the particular material from which the pressure suit 10 is fabricated forms no specific part of the instant invention, it is to be understood that materials such as layered glass fiber may be provided. It is to be understood further that the suit 10 is of a substantially rigid, tubular configuration and includes a torso section comprising an upper segment 12 and a lower segment 14.

The upper segment 12 of the torso section includes an axilla zone 16, a shoulder zone 18 and an entry closure zone 19, along which the segments 12 and 14 of the pressure suit are united by an entry closure assembly 20.

The closure zone 19 lies in a pair of angularly related planes. The first plane is projected beneath the axilla zone 16 of the suit, in transverse relationship with the longitudinal axis of the suit, while the second plane is extended in substantial parallelism with a longitudinal plane of symmetry for the suit. As shown, the second plane within which the closure zone lies extends behind the shoulder zone 18, as best illustrated in FIG. 1.

The entry closure assembly 20, as best shown in FIG. 3, includes a first endless member 22 which circumscribes the opening of the upper segment 12, and a second endless member 24 which circumscribes the opening of the lower segment 14. The endless members 22 and 24 are of a configuration similar to the configuration of the closure zone 19 and, preferably, are fabricated from a suitable rigid, lightweight material. The particular material from which the endless members 22 and 24 are fabricated may be varied and is deemed to be a matter of convenience only, provided the parameters, such as strength, are met.

As can be appreciated, the endless members 22 and 24 are permanently attached to the material of the upper and lower segments 12 and 14, respectively, of the pressure suit 10 employing a suitable material such as an adhesive or the like.

It is imperative, of course, that an hermetic sealing of the endless members 22 and 24 be facilitated at the interface between the segments 12 and 14 as a coupling thereof is effected. Consequently, the mating surfaces of the endless members are transversely angulated in a manner which, as will hereinafter become more readily apparent, serve to assure that a positive union between the members is achieved as an hermetic seal between the members is established as the members are caused to mate during a donning of the pressure suit 10.

It should be noted that the endless members 22 and 24 also include first and second arcuate segments, 25a, 25b and 26a and 26b, respectively, disposed in substantially orthogonally related planes, rather than a single plane. Moreover, these planes are arranged so that the plane of the first segments 25b and 26b substantially bisects the torso of the suit just below the axilla zone 16, while the vertical plane passes behind the shoulders of the suit 10. The transition sections between these planes are located generally beneath the shoulder zone 18, as best shown in FIG. 1.

It should be noted that the first endless member 22 has no moving parts. It also should be noted that the endless member 22, however, includes an endless surface 28 of a varying configuration the purpose of which is to mate in an interlocked, hermetically sealed relation with the surface 30 of the endless member 24. Thus an interlocked and hermetically sealed joint is established between the upper and lower segments 12 and 14 of the suit 10 as the suit is assembled.

Within the surface 28 of the segment 25a, located above the shoulder zone 18 of the suit 10, there is defined a groove 32, FIG. 10. This groove is configured to receive a tongue 34 projected from the surface 30 of segment 26a of the closure member 24, as illustrated in FIG. 10. As illustrated in FIG. 12, the configuration of the surface 28 transitions in the transition sections of the planes, aforementioned, to form a simple shoulder section, not designated, for receiving a shoulder section of a mirror image configuration, formed in the surface 30 of the second endless member 24. Turning now to FIG. 11, it will be seen that the surface 28 of the endless member 22 further transitions to a protuberance forming a spline 36 while the configuration of the surface 30 transitions to a channular configuration, forming a keyway 38 for receiving the spline 36.

It will at this juncture be apparent that the endless member 22 is received by the endless member 24 as the upper segment 12 is axially displaced toward the lower segment 14 of the suit 10. Moreover, it should be apparent that due to the resulting angulated configurations of the surfaces 28 and 30, which are mated as the upper and lower segments are axially displaced toward one another, pressures within the suit, acting in an outward direction, are resisted.

Axial displacement of the upper segment 12 relative to the lower segment 14 of the suit is precluded through the use of a simple and economical coupling mechanism, generally designated 40. The coupling mechanism 40 comprises a segmented "C" section clamp 41 including segments 42 and 43, and a simple over-center locking mechanism 44. The purpose of the coupling assembly 40 is to facilitate a rapid and simplified coupling of the upper segment 12 to the lower segment 14, as self-donning of the pressure suit 10 is effected.

It should, at this juncture, be noted that an arcuate shoulder surface 46, FIGS. 11, 13 and 14, projects outwardly from the endless member 24, while the endless member 22 includes an arcuate rib 48, FIGS. 13 and 14, projected radially above the spline 36. Moreover, the rib 48 is provided with a radially opening slot 50 extending substantially across the circumferential front of the segment 14.

Figure 8:
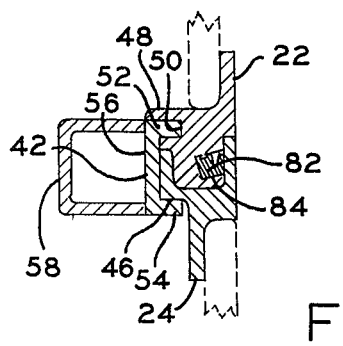
FIG. 8 is a partially sectioned view taken along lines 8—8 of FIG. 4, depicting a preferred configuration for the "C" section clamp.

The "C" section clamp 41 includes an upper flange 52, FIGS. 8 and 13, configured to be received within the slot 50, and a lower flange 54 configured to engage the surface 46, FIG. 8. A web 56 extends between and unites the flanges 52 and 54, while a stiffener 58 serves to support the "C" section clamp in its arcuate configuration. Once the flanges 52 and 54 are received within the slot 50 and engage the shoulder surface 46, respectively, as contraction of the expansible coupling mechanism 40 occurs, the endless members 22 and 24 become secured against mutual displacement, FIG. 6A. However, upon a simple manipulation of the over-center latch 44, the expansible coupling mechanism 40 permits the flange 52 to be withdrawn from the slot 50 and the flange 54 to be drawn out of engagement with the shoulder surface 46 for thus accommodating an expansion of the coupling mechanism, FIG. 6B.

Figure 9:
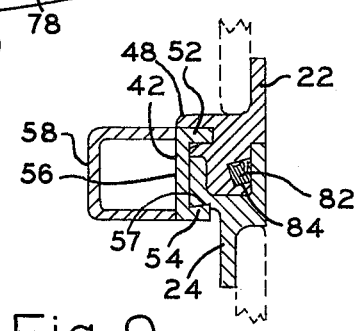
FIG. 9 is a cross-sectional view similar to FIG. 8 but depicting another preferred configuration for the "C" section clamp.
Figure 7:
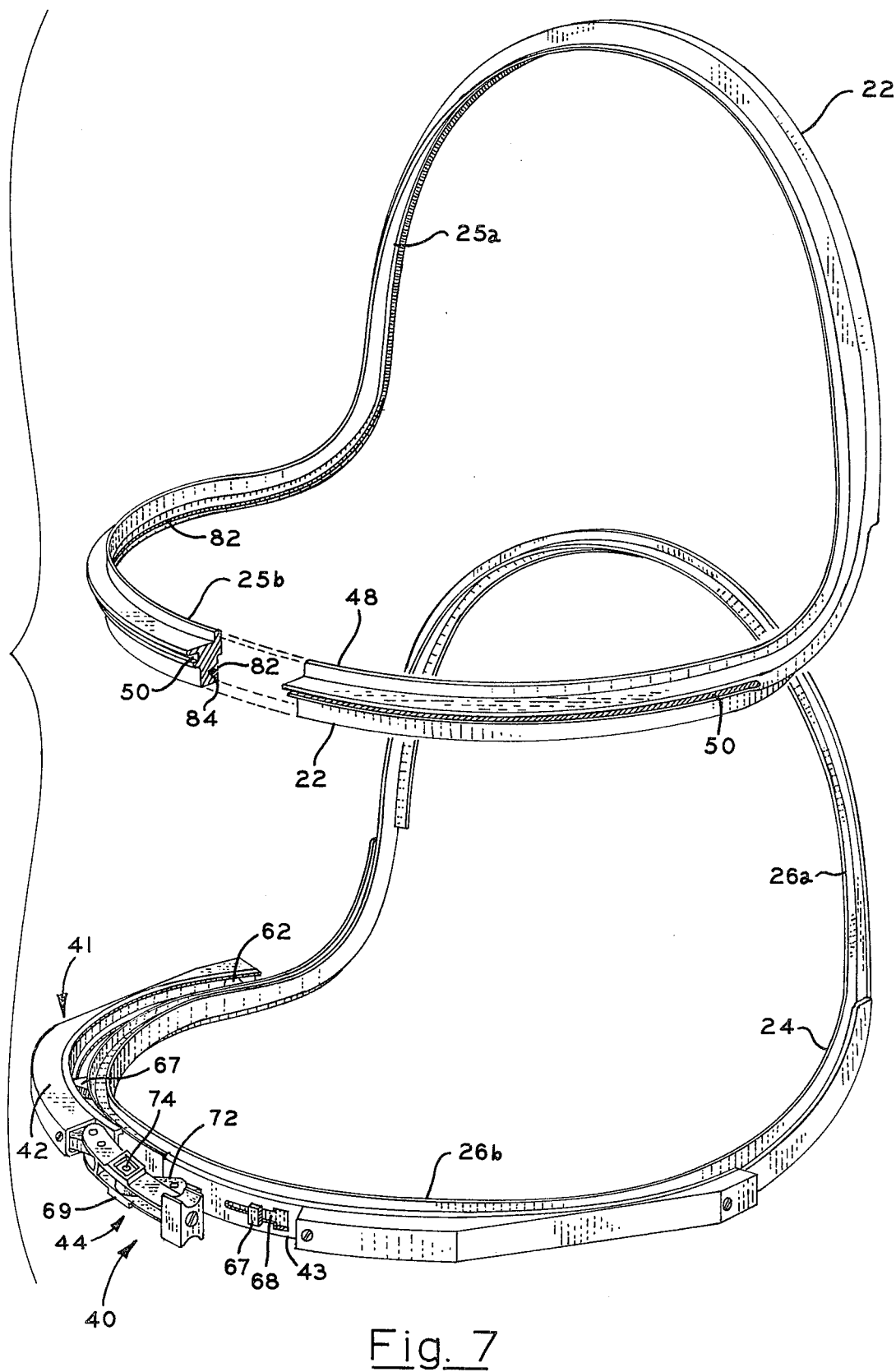
FIG. 7 is an exploded perspective view illustrating the closure members.

As a practical matter, as best shown in FIG. 9, for assuring that pressures developed within the suit 10 will not force the first endless member 22 radially out of engagement with the adjacent surface 30 of the second endless member 24, the flange 54 may be thickened, as indicated in FIG. 9, and received in an arcuate relief 57. Thus radially directed forces applied to the clamp 42 may be further resisted. When employing a thickened flange 54, as illustrated, it is desirable to chamfer the lower edge of the slot 50, as also illustrated in FIG. 9, for purposes of accommodating insertion of the flange 52 into the slot 50.

The "C" section clamp 41 is pivotally supported at each of its opposite ends by a coupling, generally designated 60, which includes headed posts 62, one of which is shown in FIG. 5, projected radially from the endless member 24 and received within an arcuate slot 64 formed in the "C" section clamp, preferably beneath the stiffener 58. Due to the arcuate configuration of the slot 64, sliding displacement of the "C" section clamp in expanding and contracting directions is facilitated. Similarly, at each of the opposite sides of the over-center latch 44, there is provided an additional headed post 66, also seated in the arcuate slot 64, for purposes of supporting the "C" section clamp as expansion and contraction of the expansible coupling assembly occurs. Further, a headed post 67 projects radially into a slot 68, formed in segments 42 and 43, in close proximity with a pivotal latching bar 69 provided for the over-center latch 44. It should therefore be apparent that the "C" section clamp of the coupling assembly 40 is radially expanded and contracted, as it is supported by the headed posts 62, 66 and 67 through a manipulation of the over-center latch 44.

The latching bar 69 of the over-center latch 44 comprises an arcuate bar pivotally connected at its base end to the "C" section clamp segment 42 while the opposite end portion of the latching bar is connected to the clamp segment 43 through a radius link 72. The radius link 72 is pivotally connected to the latching bar 69 through a suitable pivot pin, designated 74, and to the clamp segment 43 at a suitable clevis coupling, designated 76.

As should be apparent to those familiar with "C" section clamps, the length of the circumference of the segmented clamp 41 is varied by a distance equal to twice the length of the radius link 72, depending upon which side of the clevis coupling 76 the link is positioned. Hence, expansion of the segmented clamp 41 is achieved by positioning the radius link 72 in a first position and contracted by repositioning the link 72 in a pivotal fashion.

Figure 6A:
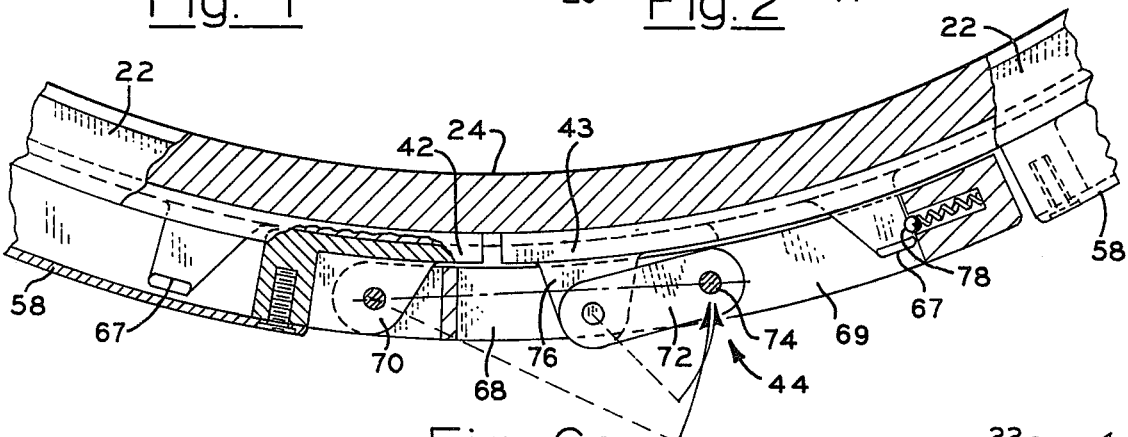
FIG. 6A is a fragmented, partially sectioned view taken along line 6—6 of FIG. 4, on somewhat of an enlarged scale, depicting the coupling mechanism in a configuration for securing the closure assembly.
Figure 6B:
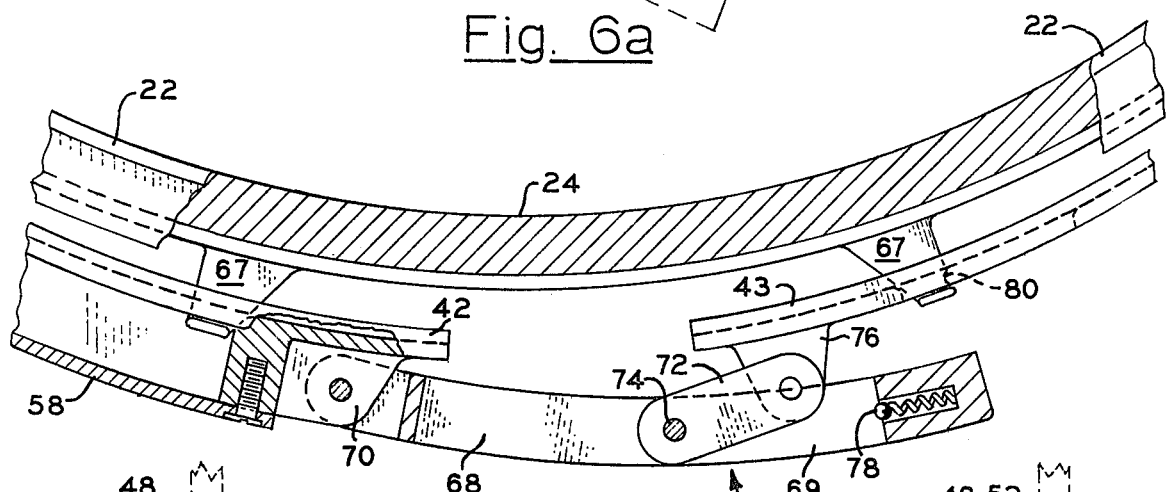
FIG. 6B is a partially sectioned, fragmented view, similar to 6A, depicting the coupling mechanism in a configuration for releasing the closure assembly.

Preferably, a spring loaded ball 78 is provided to seat in a detent 80 formed in the headed post 67 when the over-center latch 44 is secured as illustrated in FIG. 6A. Finally, where desired, to further ensure that an hermetic seal is established between the surfaces 28 and 30, a suitable packing 82 seated in a groove 84 is provided, as illustrated in FIGS. 12 and 13.

OPERATION

It is believed that in view of the foregoing description, the operation of the device will readily be understood, however, for the sake of clarity, it will be briefly reviewed.

The upper and lower segments 12 and 14 of the pressure suit 10 are donned in a manner which should readily be apparent. Due to the configuration of the closure zone 19, self-donning is readily facilitated. A wearer, in order to secure the upper segment 12 to the lower segment 14, simply seats the tongue 34 in the groove 32 and then drops the spline 36 into the keyway 38 for thus bringing the surfaces 28 and 30 into contiguous engagement.

The over-center latch is then manipulated for drawing the clamp segments 42 and 43 toward each other as the radius link 72 reverses its position relative to the clevis coupling 76. As the coupling assembly 40 is thus contracted, the flange 52 seats in the slot 50 of the rib 48 while the flange 54 engages the shoulder surface 46 for thus securing the endless members 22 and 24 in an integrated and sealed relationship. Due to the angulated configurations of the mated surfaces 28 and 30, forces developed within the suit, due to pressurization thereof, are resisted while mutual displacement of the segments 12 and 14 in axial directions is precluded by the "C" section clamp 41 of the coupling assembly 40.

Release is readily effected simply by pivotally displacing the latching bar 69 in a reverse direction for expanding the expansible coupling assembly 40 for thus withdrawing the flanges 52 and 54 out of engagement with the slot 50 and the shoulder surface 46, respectively. The segments 12 and 14 of the suit 10 are thus released for mutual displacement.

In view of the foregoing, it should be apparent that the closure assembly of the instant invention provides a practical solution to the perplexing problem of simplifying self-donning of pressure suits.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A separable closure assembly joining a pair of coaxially aligned, axially separable, tubular segments of a pressure suit along a zone of separation having a first portion disposed in a plane projected transversely with respect to the longitudinal axis of the suit beneath the shoulder zone thereof, a second portion disposed in a plane projected behind said shoulder zone in substantial parallelism with the plane of said axis comprising:
   A. a first endless member concentrically related to the suit and affixed to one segment thereof characterized by a first endless sealing surface of a transversely angulated cofiguration,
   B. a second endless member concentrically related to the suit and affixed to the other segment thereof characterized by a second endless sealing surface of a transversely angulated configuration mated in contiguous relation with the first endless surface; and C. means releasably securing said surfaces in contiguous relation including a radially expansible "C" section clamp disposed in an engaged relationship with said endless members.

2. In a separable closure assembly joining coaxially aligned tubular segments of a pressure suit, the improvement comprising:
   A. a first endless member of a rigid configuration affixed to a first segment of the suit in circumscribing relation therewith;
   B. a second endless member of a rigid configuration affixed to a second segment of the suit in circumscribing relation therewith receiving said first endless member in a mated, contiguous relationship;
   C. each of said endless members including multiple arcuate segments disposed in multiple angularly related planes;
   D. coupling means releasably securing said first endless member to said second endless member; and
   E. means for establishing an hermetic seal between said endless members.

3. The improvement of claim 2 wherein said pressure suit includes a torso section characterized by an axilla zone and a shoulder zone, and each of said endless members includes a first arcuate segment disposed in a first plane projected transversely beneath the axilla zone and a second arcuate segment disposed in a second plane projected longitudinally to the rear of the shoulder zone of the suit.

4. The improvement of claim 3 wherein said first segment of said first endless member includes an axially projected arcuate protuberance defining an arcuate spline, and said first segment of said second endless member includes an axially opening arcuate channel defining an arcuate keyway receiving said spline in mated relation.

5. The improvement of claim 4 wherein said coupling means includes:
   A. a rib projected radially from said first endless member beneath the axilla zone characterized by a radially opening slot;
   B. a shoulder surface projected radially from said second endless member in coaxial alignment with said rib;
   C. a radially expansible "C" section clamp of an arcuate configuration; and
   D. mounting means connecting said clamp to second endless member beneath the axilla zone in circumscribing concentric relation with said rib including a first annular flange seated in said radially opening slot, and a second annular flange contiguously related to said shoulder surface, and tensioning means for releasably securing said clamp against radial expansion.

6. The improvement of claim 5 wherein said shoulder surface includes an arcuate relief, second annular flange includes an arcuate lip seated in said relief.

7. The improvement of claim 5 wherein said tensioning means includes an over-center coupling mechanism, and said mounting means includes a pair of circumferentially slotted openings defined in said clamp and a pair of circumferentially spaced headed posts projected radially from said second endless member and received in said pair of slotted openings.

8. In a separable closure assembly joining coaxially aligned tubular segments of a pressure suit, the improvement comprising:
   A. a first endless member of a rigid configuration affixed to a first segment of the suit in circumscribing relation therewith;
   B. a second endless member of a rigid configuration affixed to a second segment of the suit in circumscribing relation therewith receiving said first endless member in a mated, contiguous relationship;
   C. coupling means releasably securing said first endless member to said second endless member;
   D. means for establishing an hermetic seal between said endless members, said means for establishing an hermetic seal between said endless members including a pair of opposed, transversely angulated surfaces disposed at the interface between said endless members and mated in an interlocking relationship.

* * * * *